United States Patent
Endo et al.

(10) Patent No.: US 9,154,232 B2
(45) Date of Patent: Oct. 6, 2015

(54) OPTICAL RECEPTION METHOD AND OPTICAL RECEIVER USING MAXIMAL-RATIO-COMBINING METHOD

(75) Inventors: Kazuomi Endo, Tokyo (JP); Yoichi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 14/112,653

(22) PCT Filed: Dec. 9, 2011

(86) PCT No.: PCT/JP2011/079115
§ 371 (c)(1),
(2), (4) Date: Oct. 18, 2013

(87) PCT Pub. No.: WO2012/144108
PCT Pub. Date: Oct. 26, 2012

(65) Prior Publication Data
US 2014/0044440 A1  Feb. 13, 2014

(30) Foreign Application Priority Data
Apr. 21, 2011 (JP) ................................. 2011-095190

(51) Int. Cl.
*H04B 10/06* (2006.01)
*H04B 10/61* (2013.01)

(52) U.S. Cl.
CPC .......... *H04B 10/6165* (2013.01); *H04B 10/614* (2013.01)

(58) Field of Classification Search
CPC ............. H04B 10/6165; H04B 10/614; H04B 10/6166
USPC ................................................ 398/202–214
See application file for complete search history.

(56) References Cited

U.S. PATENT DOCUMENTS 4,965,858 A * 10/1990 Naito et al. .................... 398/205
5,003,626 A *  3/1991 Kuwahara et al. ............ 398/204
(Continued)

FOREIGN PATENT DOCUMENTS

JP    H05-224267 A     9/1993
JP    2001-333005 A    11/2001
(Continued)

OTHER PUBLICATIONS

Kikuchi, K., "Optical Homodyne Receiver Comprising Phase and Polarization Diversities with Digital Signal Processing," IEEE/LEOS Summer Topical Meetings, 2007 Digest of the , vol., No., pp. 55,56, Jul. 23-25, 2007.*

(Continued)

*Primary Examiner* — Ken Vanderpuye
*Assistant Examiner* — Dibson Sanchez
(74) *Attorney, Agent, or Firm* — Sughrue Mion, PLLC

(57) ABSTRACT

In order to allow reception in which receive sensitivity does not depend upon polarization state in reception of a multi-level phase optical signal, in this optical reception method, a multi-level phase optical signal of a single polarization is separated into a first optical signal and a second optical signal of which polarizations are mutually orthogonal, the ratio of the power of the first optical signal to the power of the second signal is calculated, and the difference between the phase of the first optical signal and the phase of second optical signal is calculated as an amount of compensation, whereupon, on the basis of the ratio and the amount of compensation, the first optical signal and the second optical signal are combined using a maximal ratio combining method, and the amount of compensation is modified on the basis of the ratio.

7 Claims, 8 Drawing Sheets

(56) References Cited

U.S. PATENT DOCUMENTS

Figure 1:
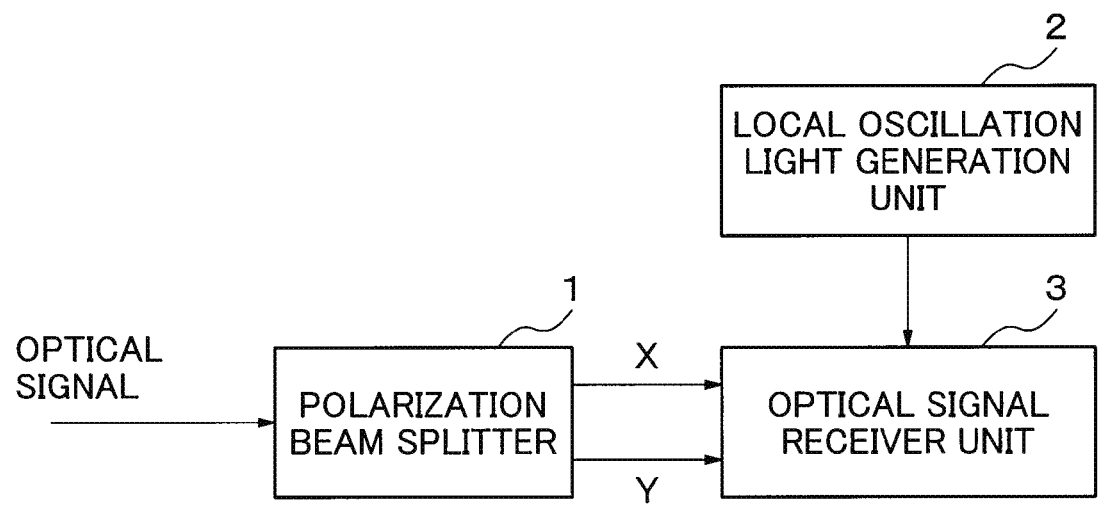

| | | | |
|---|---|---|---|
| 5,142,402 A * | 8/1992 | Tsushima et al. | 398/205 |
| 5,253,097 A * | 10/1993 | Naito et al. | 398/205 |
| 5,388,088 A * | 2/1995 | Gans et al. | 398/65 |
| 5,523,875 A * | 6/1996 | Morris | 398/209 |
| 2002/0109885 A1 * | 8/2002 | Aburakawa et al. | 359/172 |
| 2008/0159758 A1 * | 7/2008 | Shpantzer et al. | 398/214 |
| 2009/0208224 A1 * | 8/2009 | Kikuchi | 398/141 |
| 2010/0254718 A1 * | 10/2010 | Oda et al. | 398/202 |
| 2011/0182589 A1 * | 7/2011 | Kotake et al. | 398/152 |
| 2011/0305457 A1 * | 12/2011 | Kikuchi | 398/65 |
| 2012/0134676 A1 * | 5/2012 | Kikuchi | 398/65 |
| 2012/0183303 A1 * | 7/2012 | Onohara et al. | 398/136 |
| 2012/0299629 A1 * | 11/2012 | Ogasahara | 327/237 |
| 2012/0315043 A1 * | 12/2012 | Nakagawa et al. | 398/65 |
| 2013/0216228 A1 * | 8/2013 | Nazarathy et al. | 398/65 |

FOREIGN PATENT DOCUMENTS

| | | |
|---|---|---|
| JP | 2010-212886 A | 9/2010 |
| JP | 2011-009956 A | 1/2011 |
| WO | 2011099589 A1 | 8/2011 |

OTHER PUBLICATIONS

Kikuchi et al, Evaluation of Sensitivity of the Digital Coherent Receiver, Jul. 2008, JLT vol. 26 issue 13, pp. 1817-1822.*

International Search Report for PCT Application No. PCT/JP2011/079115, Mailed on Mar. 6, 2012.

Satoshi Tsukamoto et al., "Optical Homodyne Receiver Comprising Phase and Polarization Diversities with Digital Signal Processing". (From IEEE Xplore, Downloaded on Jul. 14, 2010).

Japanese Office Action for JP Application No. 2013-510847 mailed on Jul. 21, 2015 with English Translation.

K. Kikuchi and S. Tsukamoto, Evaluation of Sensitivity of the Digital Coherent Receiver, Journal of Lightwave Technology, vol. 26, No. 13, pp. 1817-1822 (Jul. 2008) Cited in JPOA.

* cited by examiner

OPTICAL RECEPTION METHOD AND OPTICAL RECEIVER USING MAXIMAL-RATIO-COMBINING METHOD

This application is a National Stage Entry of PCT/JP2011/079115 filed Dec. 9, 2011, which claims priority from Japanese Patent Application 2011-095190 filed Apr. 21, 2011, the contents of all of which are incorporated herein by reference, in their entirety.

TECHNICAL FIELD

The invention relates to an optical reception method and an optical receiver.

BACKGROUND ART

Many coherent optical communication systems which use a multi-level modulation signal in order to increase transmission capacity in an optical communication system are disclosed. In these systems, a polarization diversity reception system in which a receiving sensitivity does not depend upon a polarization state is disclosed, like Non-patent literature (NPL) 1. In the system, a polarization beam splitter separates the multi-level modulation optical signal into two polarization optical signals which are mutually orthogonal. A 90-degree hybrid mixes each of separated optical signals with a local oscillation light, and outputs optical signals each corresponding to an in-phase component and an orthogonal component. A photo diode converts the optical signal outputted from each of the 90-degree hybrids into an electric signal.

In NPL 1, correction for change of the receiving sensitivity due to a polarization state of input signals is achieved by digital signal processing. Namely, in NPL 1, an arrangement is not performed in which a polarization plane of the optical signal is conformed to a base line of the polarization beam splitter.

In NPL 1, a Maximal-Ratio-Combining (MRC) method is employed as the digital signal processing correcting the change of the receiving sensitivity due to the polarization state of input signals. In NPL 1, specifically, a power ratio $\alpha$ and a phase difference $\delta$ of output signals Ex and Ey of the 90-degree hybrids are calculated. An original optical modulation signal Es is reproduced by the MRC as shown in the equation (1) below, $$E_S = \sqrt{\alpha} e^{-j\delta} E_x + \sqrt{1-\alpha} E_y \qquad (1)$$

where j is an imaginary unit. The $\sqrt{\alpha}$ in the first term of the equation (1) and the $\sqrt{1-\alpha}$ in the second term thereof are correction terms for maximizing output power.

The $e^{-j\delta}$ in the first term of the equation (1) represents a term for correcting the phase difference between Ex and Ey.

CITATION LIST

Patent Literature (PTL)

[PTL 1] Japanese Patent Application Laid-Open Publication No. 2001-333005
[PTL 2] Japanese Patent Application Laid-Open Publication No. 2011-009956

Non Patent Literature

[NPL 1] Satoshi Tsukamoto et al., "Optical Homodyne Receiver Comprising Phase and Polarization Diversities with Digital Signal Processing", European Conference on Optical Communication, Mo4.2.1. Cannes, France, 24-28 Sep. 2006

SUMMARY OF INVENTION

Technical Problem

Figure 8:
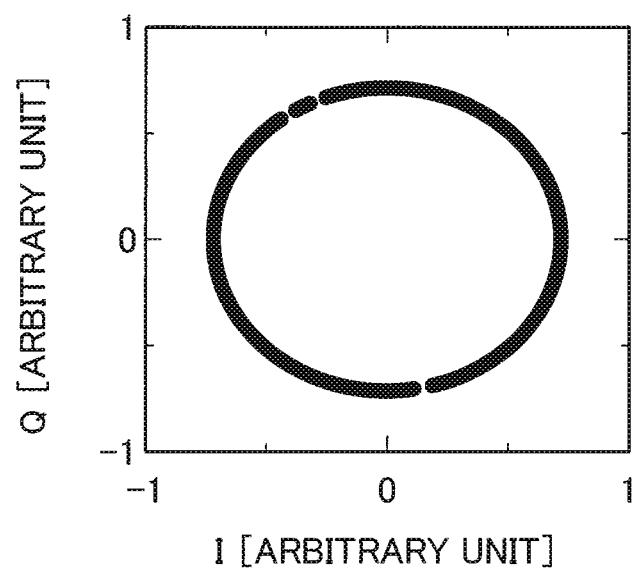

In the digital signal processing disclosed in NPL 1, for example, if the polarization state of the input optical signal on the Poincare sphere lies near polarization angle $\theta=0$ degree and ellipticity $\chi=0$, the ratio of the power $\alpha$ is 1 and the equation (1) gives $E_s \approx e^{-j\delta} Ex$. However, since the difference of the phase $\delta$ is a random value, random rotation of the signal is generated on a constellation as shown in FIG. 8 and the signal cannot be reproduced in the digital signal processing disclosed in NPL 1. The reason why the phase $\delta$ is a random value is that when the polarization state of the input optical signal on the Poincare sphere lies near polarization angle $\theta=0$ degree and ellipticity $\chi=0$, one of the output signals of the 90-degree hybrids is almost a transmission output signal itself, and the other one of the transmission output signals is embedded in noises.

An object of the inventions is to provide an optical reception method and an optical receiver in which a receiving sensitivity does not depend upon a polarization state in reception of the multi-level phase optical signal.

Solution to Problem

An optical reception method of the invention includes separating a multi-level phase optical signal of a single polarization into a first optical signal and a second optical signal of which polarizations are mutually orthogonal, calculating a ratio of power of the first optical signal to power of the second optical signal, calculating a difference between a phase of the first optical signal and a phase of the second optical signal, as an amount of compensation, combining, on the basis of the ratio and the amount of compensation, the first optical signal and the second optical signal using a maximal ratio combining method, and modifying the amount of compensation on the basis of the ratio.

An optical receiver includes means for separating a Multi-level phase optical signal of a signal polarization into a first optical signal and a second optical signal of which polarizations are mutually orthogonal, means for calculating a ratio of power of the first optical signal to power of the second optical signal and a difference between a phase of the first optical signal and a phase of second optical signal, as an amount of compensation, and means for combining, on the basis of the ratio and the amount of compensation, the first optical signal and the second optical signal using a maximal ratio combining method, wherein the amount of compensation is modified on the basis of the ratio.

Advantageous Effect of the Invention

According to the invention, reception of the multi-level phase optical signal in which the receiving sensitivity does not depend on the polarization state becomes possible.

BRIEF EXPLANATION ON DRAWINGS

Figure 2:
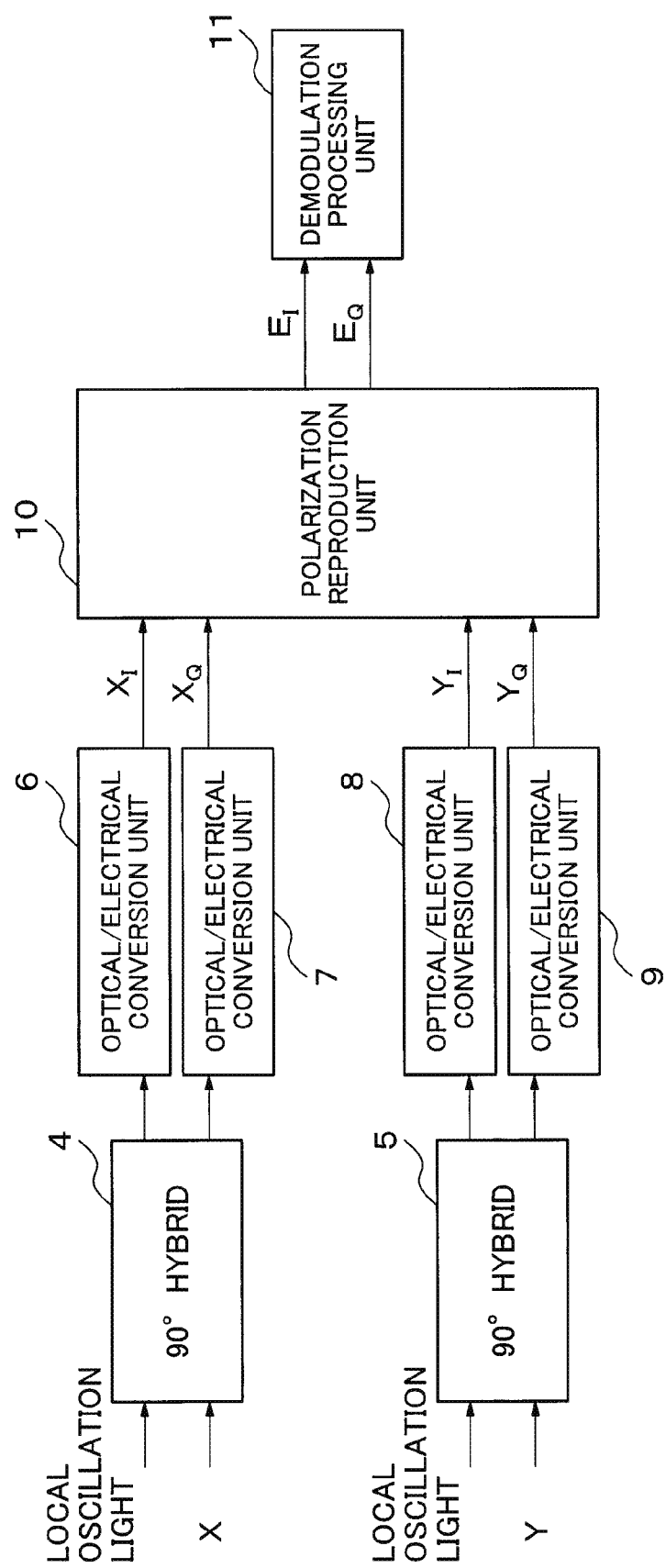

FIG. 1 A block diagram illustrating an example of a configuration of a coherent optical receiver according to a first exemplary embodiment of the invention FIG. 2 A block diagram illustrating an example of a configuration of an optical signal receiver unit configuring the coherent optical receiver shown in FIG. 1

Figure 3:
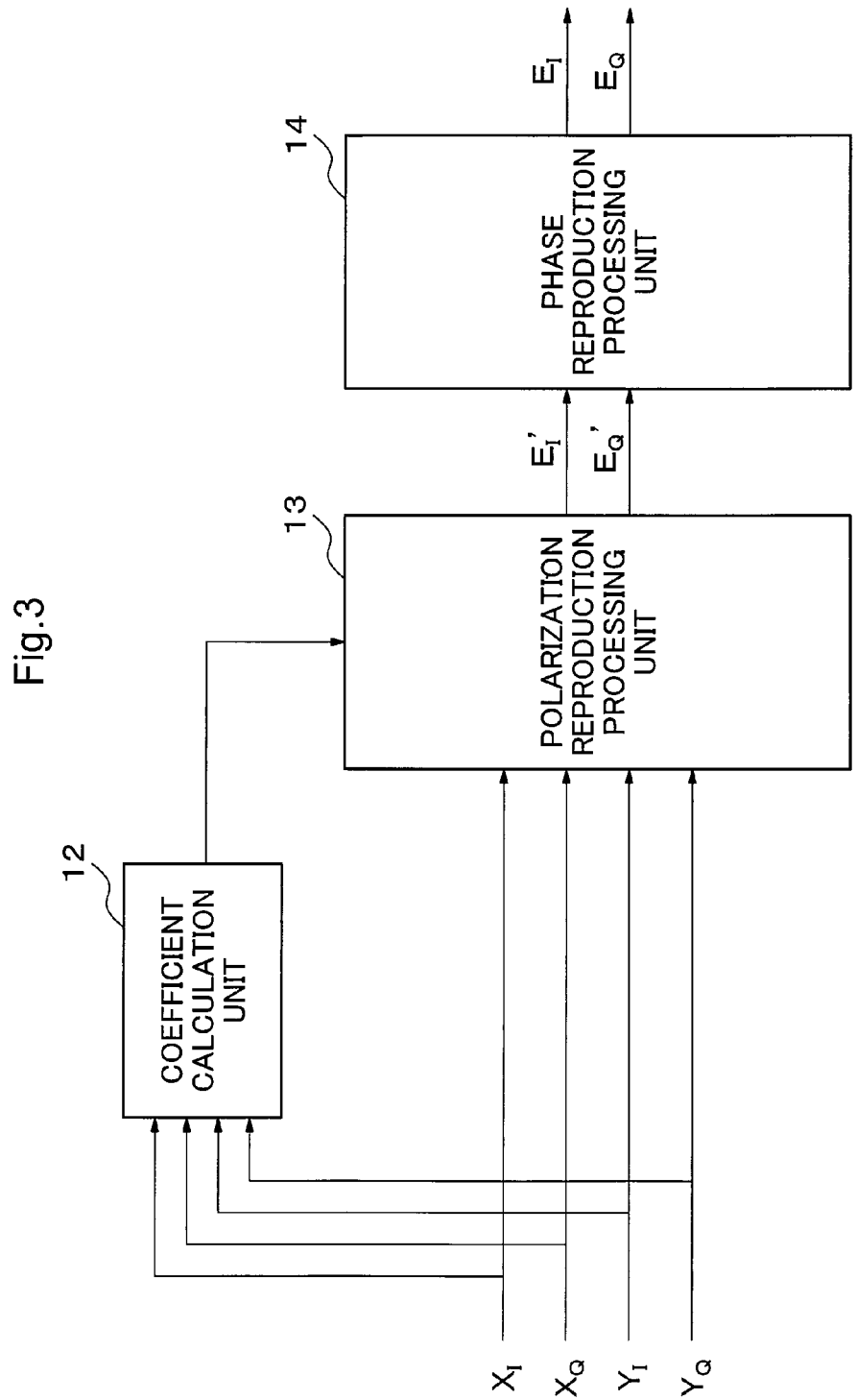

FIG. 3 A block diagram illustrating an example of a configuration of a polarization reproduction unit configuring the optical signal receiver unit shown in FIG. 2

Figure 4:
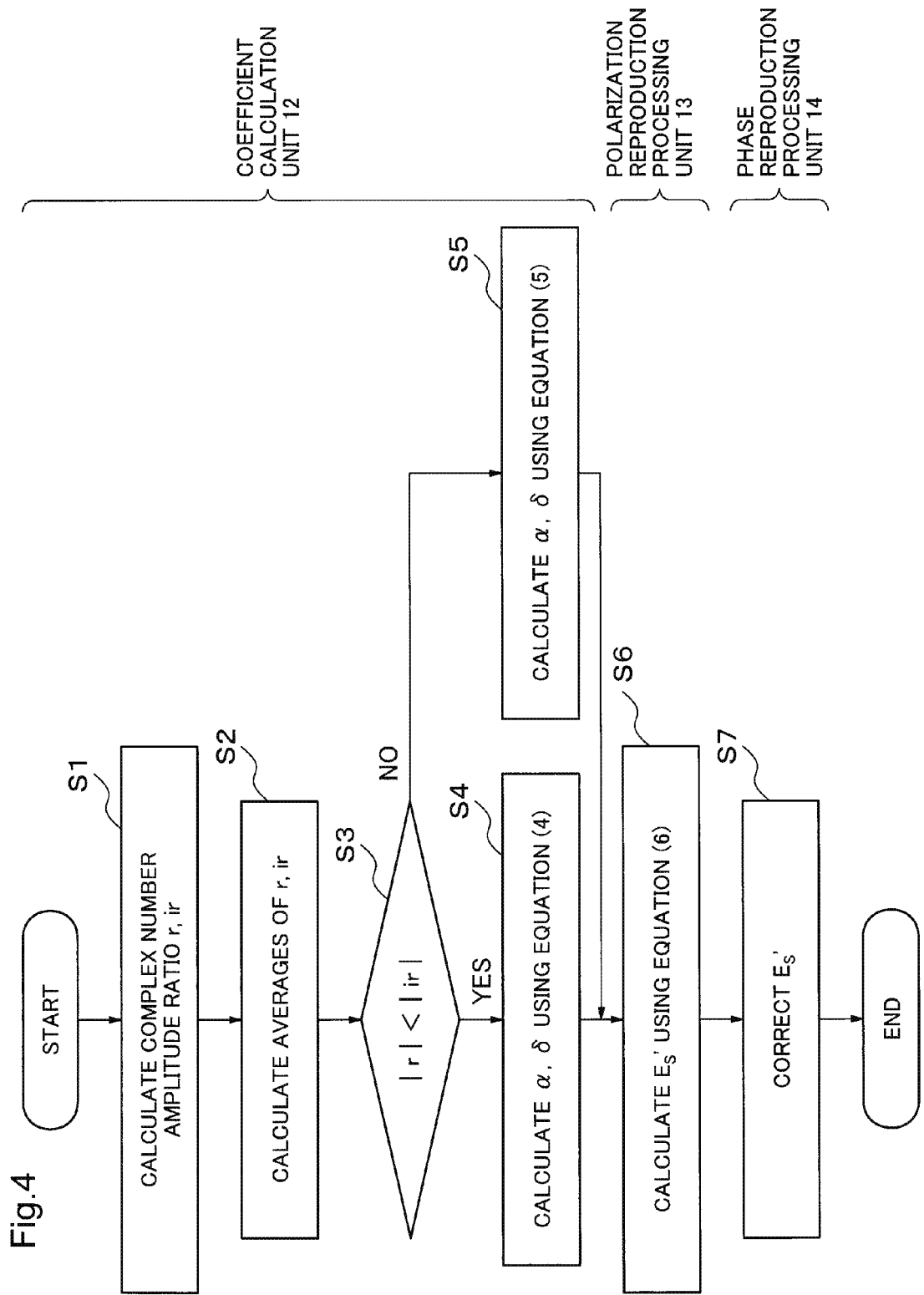

FIG. 4 A flowchart illustrating an example of operations of the polarization reproduction unit shown in FIG. 3

Figure 5:
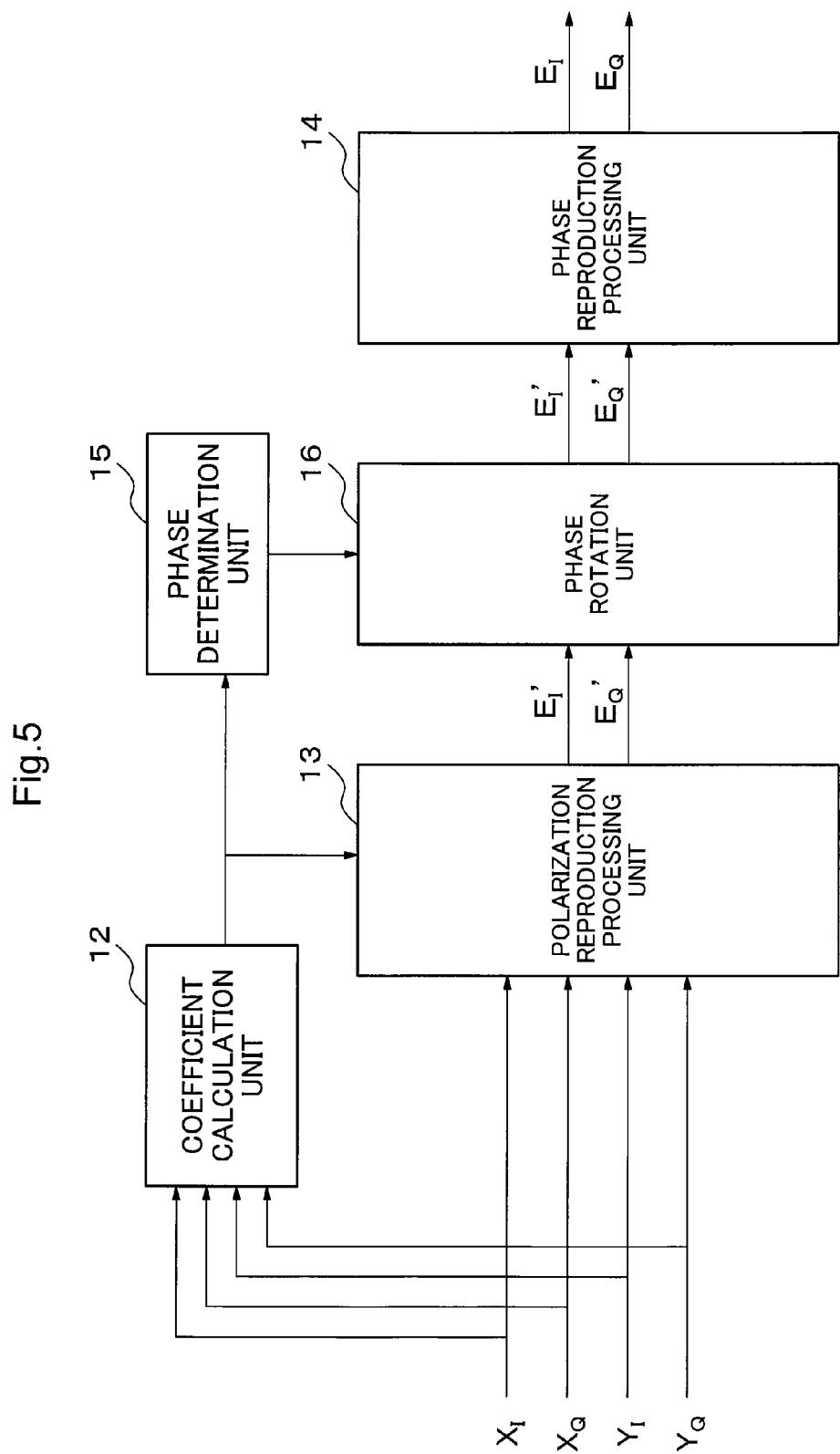
Figure 6:
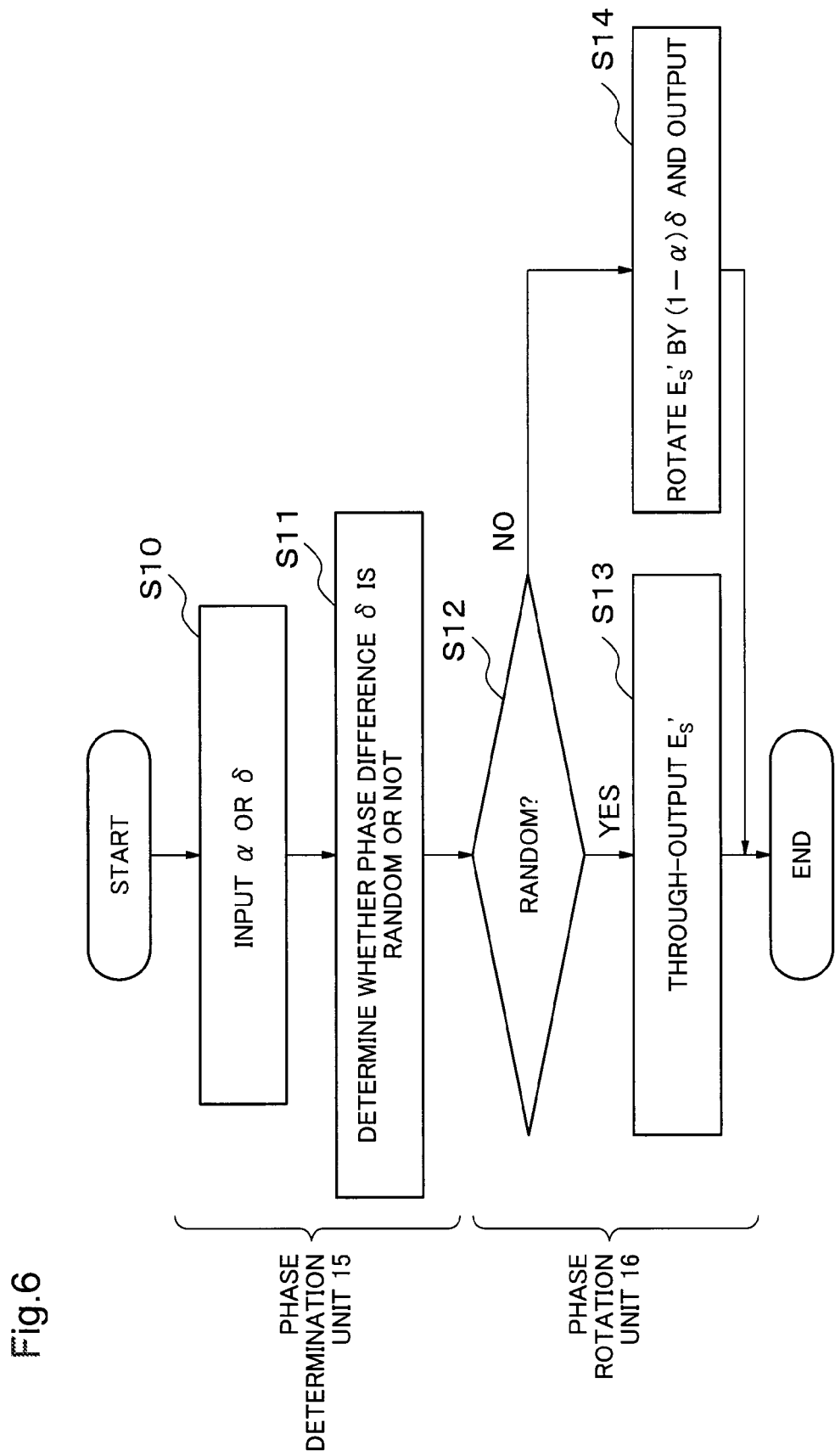
Figure 7:
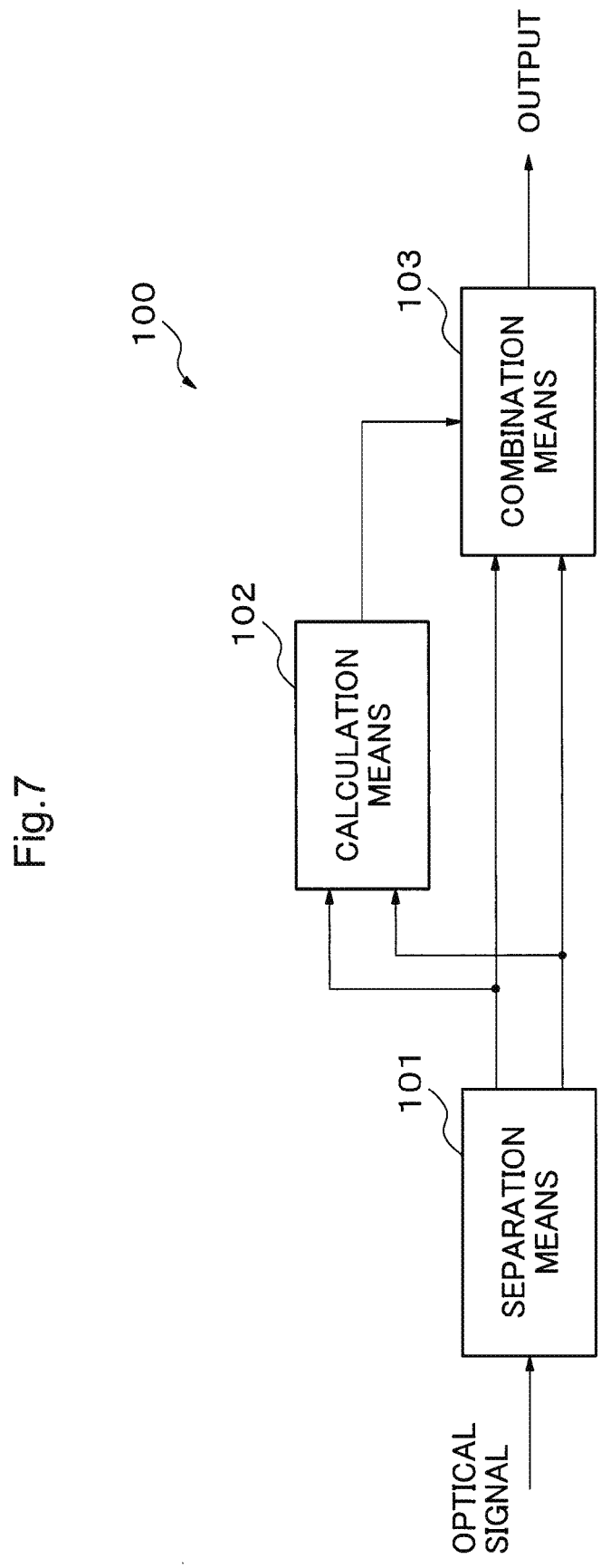

FIG. 5 A block diagram illustrating an example of a configuration of the polarization reproduction unit configuring the coherent optical receiver according to a second exemplary embodiment of the invention FIG. 6 A flowchart illustrating an example of operations of the polarization reproduction unit shown in FIG. 5, FIG. 7 A block diagram illustrating an example of a configuration of a coherent optical receiver according to a third exemplary embodiment of the invention FIG. 8 An example of a constellation in the polarization state near the polarization angle θ=0 degree and the ellipticity χ=0 on the Poincare sphere in the technology described in NPL 1.

DESCRIPTION OF EMBODIMENTS

First Exemplary Embodiment

FIG. 1 is a block diagram illustrating an example of a configuration of a coherent optical receiver according to a first exemplary embodiment of the invention. The coherent optical receiver includes a polarization beam splitter 1, a local oscillation light generation unit 2, and an optical receiver unit 3.

The polarization beam splitter 1 separates a multi-level modulation optical signal (or referred to as single polarization multi-level phase optical signal) into an optical signal X (first optical signal) and an optical signal Y (second optical signal) whose polarization are mutually orthogonal. The local oscillation light generation unit 2 is, for example, a distributed-feedback laser diode, and outputs a continuous light (hereinafter referred to as local oscillation light).

The optical receiver unit 3 performs coherent detection (e.g. homodyne detection or heterodyne detection) of the signals X and Y, and converts the detected signals into baseband signals X and Y, using the local oscillation light generated by the local oscillation light generation unit 2. Further, the optical receiver unit 3 reproduces the transmitted multi-level modulation optical signal based on the baseband signals X and Y, and performs demodulation processing.

FIG. 2 is a block diagram illustrating an example of a configuration of an optical signal receiver unit 3. The optical signal receiver unit 3 includes 90-degree hybrids 4 and 5, optical/electrical conversion units 6, 7, 8 and 9, a polarization reproduction unit 10, and a demodulation processing unit 11.

The 90-degree hybrid 4 receives the optical signal X and the local oscillation light, and outputs optical signals each corresponding to an in-phase component and an orthogonal component. The optical/electrical conversion unit 6 receives an optical signal corresponding to the in-phase component of the optical signal X and outputs an in-phase baseband signal $X_I$. The optical/electrical conversion unit 7 receives an optical signal corresponding to the orthogonal component of the optical signal X and outputs an orthogonal baseband signal $X_Q$.

The 90-degree hybrid 5 receives the optical signal Y and the local oscillation light, and outputs optical signals each corresponding to the in-phase component and the orthogonal component. The optical/electrical conversion unit 8 receives an optical signal corresponding to the in-phase component of the optical signal Y and outputs an in-phase baseband signal $Y_I$. The optical/electrical conversion unit 9 receives an optical signal corresponding to the orthogonal component of the optical signal Y and outputs an orthogonal baseband signal $Y_Q$.

The polarization reproduction unit 10 receives the baseband signals $X_I$, $X_Q$, $Y_I$, and $Y_Q$ from the optical/electrical conversion units 6, 7, 8 and 9, respectively. The polarization reproduction unit 10 calculates a ratio of power α and a phase difference δ between the optical signal X and the optical signal Y separated by the polarization beam splitter 1 of FIG. 1, based on signal components included therein. Here, the phase difference means a difference between phases of two waves (optical signal Y and the optical signal X). The polarization reproduction unit 10 reproduces an in-phase baseband signal $E_I$ and an orthogonal baseband signal $E_Q$ corresponding to transmission information based on the calculated the ratio of the power α and the phase difference δ.

The demodulation processing unit 11 demodulates the in-phase baseband signal $E_I$ and the orthogonal baseband signal $E_Q$ and extracts the transmission information.

FIG. 3 is a block diagram illustrating an example of a configuration of the polarization reproduction unit 10. The polarization reproduction unit 10 includes a coefficient calculation unit 12, a polarization reproduction processing unit 13 and a phase reproduction processing unit 14.

The coefficient calculation unit 12 calculates the ratio of the power α and the phase difference δ between the optical signal X and the optical signal Y based on the baseband signals $X_I$, $X_Q$, $Y_I$, and $Y_Q$.

The polarization reproduction processing unit 13 calculates an in-phase baseband signal $E_I'$ and an orthogonal baseband signal $E_Q'$ based on the calculated ratio of the power α and the calculated phase difference δ.

The phase reproduction processing unit 14 outputs the in-phase baseband signal $E_I$ and the orthogonal baseband signal $E_Q$ in which phase offset caused by a difference between central frequencies of a signal light and a local light and/or a difference of a line width are compensated FIG. 4 is a flowchart illustrating an example of operations of the polarization reproduction unit 10 shown in FIG. 3. FIG. 4 is explained below optionally referring to FIG. 1 to FIG. 3.

In order to calculate the ratio of the power α and the phase difference δ, the coefficient calculation unit 12 calculates complex amplitude ratios r and ir of $E_x$ and $E_y$ using the equation (2) and the equation (3) (step S1), $$r = E_x/E_y \quad (2)$$

$$ir = E_y/E_x \quad (3)$$

where $E_x$ is a complex number represented as $X_I + jX_Q$, $E_y$ is a complex number represented as $Y_I + jY_Q$, and j represents an imaginary unit.

The coefficient calculation unit 12 calculates averages of each of the complex amplitude ratios r and ir (step S2). As an example of the average, an addition average, or a multiplication average is exemplified.

The coefficient calculation unit 12 compares a magnitude of |r| which is an absolute value of r with a magnitude of |ir| which is an absolute value of ir (step S3).

The complex amplitude ratios r and ir can be represented as following equations (4) and (5) by using the ratio of the power α and the phase difference δ, $$r = \sqrt{\alpha} e^{j\delta}/\sqrt{1-\alpha} \quad (4)$$

$$ir = \sqrt{1-\alpha} e^{-j\delta}/\sqrt{\alpha} \quad (5)$$

If $|r|<|ir|$ (Yes in step S3) in the comparison result above, the coefficient calculation unit 12 calculates the ratio of the power α and the phase difference δ using the equation (4) (step S4). Specifically, the coefficient calculation unit 12 calculates $\alpha=|r|^2/(|r|^2+1)$ and $\delta=\arg(r)$.

On the other hand, if $|r|\geq|ir|$ (No in step S3) in the comparison above, the coefficient calculation unit 12 calculates the ratio of the power α and the phase difference δ using the above equation (5) (step S5). Specifically, the coefficient calculation unit 12 calculates $\alpha=1/(|ir|^2+1)$ and $\delta=-\arg(ir)$.

The polarization reproduction processing unit 13 calculates, based on the ratio of the power α and the phase difference δ calculated by the coefficient calculation unit 12, a complex signal $E_s'$ in accordance with the maximal-ratio combining with the algorithm shown in the following equation (6) (step S6), $$E_s' = \sqrt{\alpha} e^{-j(1-\alpha)\delta} E_x + \sqrt{1-\alpha} e^{j\alpha\delta} E_y \quad (6)$$

The polarization reproduction processing unit 13 outputs a real part and an imaginary part of the complex signal $E_s'$, as the in-phase baseband signal $E_I'$ and the orthogonal baseband signal $E_Q'$, respectively.

The phase reproduction processing unit 14 corrects the outputted baseband signal $E_s'$ rotated by $-(1-\alpha)\delta$ compared with an optical transmission signal, based on a carrier phase estimation method, e.g. Feed Forward M-th Power Algorithm, or Decision-Directed Phase-Locked Loop (step S7). At this time, for instance, though a phase rotates due to a phase noise of a local oscillation light in optical synchronous detection or relative frequency fluctuation of the local oscillation light and an optical signal of a transmission side, the phase noise and the frequency fluctuation can be compensated at the same time.

As described above, according to the first exemplary embodiment, as the ratio of the power α approaches 1, the second term in the phase difference correction terms ($e^{-j(1-\alpha)\delta}$, $e^{j\alpha\delta}$) becomes dominant compared with the first term therein. On the other hand, as the ratio of the power α approaches zero, the first term in the phase difference correction terms becomes dominant compared with the second term therein. Here, since Ex>>Ey and α≈1 near the polarization angle θ=0 degree and the ellipticity χ=0, Es'≈Ex is obtained by substituting α≈1 into the equation (6). Even if the phase difference is a random value, there is no influence therefrom. And therefore, problem which occurs when the polarization state on the Poincare sphere lies near the polarization angle θ=0 degree and the ellipticity χ=0, is avoidable.

Namely, according to the first exemplary embodiment described above, when the multi-level phase optical signal is received, reception of the optical signal in which the receiving sensitivity does not depend on the polarization state is possible. Further, polarization reproduction can be conducted in a digital region having a low price and high reliability.

Incidentally, instead of α in the phase difference correction term in the equation (6), the functions f(α) exemplified below can be employed, which give f(0)=0 and f(1)=1, and are continuous from α=0 to α=1, and monotonously increase such as $\alpha^2$, $\sqrt{\alpha}$.

The process of step S2 in FIG. 4 is not necessarily required. The ratio of the power α, and further the phase difference δ may be averaged (addition average or multiplication average).

Second Exemplary Embodiment

Incidentally, as described above, if the phase difference is not a random value, the polarization reproduction processing unit 13 shown in FIG. 3 outputs a signal rotated by $-(1-\alpha)\delta$ compared with the optical transmission signal (i.e. signal in which a phase of the combined signal is compensated on the basis of the amount of compensation after modification). Here, the phase reproduction processing unit 14 shown in FIG. 4 conducts frequency compensation processing and phase compensation processing. In the above processing, a symbol may be falsely recognized. This exemplary embodiment solves the problem.

A coherent optical receiver of the second exemplary embodiment of the invention is described below.

A basic configuration of the coherent optical receiver is the same as the basic configuration of the first exemplary embodiment shown in FIG. 1. A configuration of an optical signal receiver unit composing the coherent optical receiver is the same as that of the optical signal receiver unit 3 of the first exemplary embodiment shown in FIG. 2. Descriptions thereof are therefore omitted.

The second exemplary embodiment differs from the first exemplary embodiment in the configuration of the polarization reproduction unit constructing the optical signal receiver unit.

FIG. 5 is a block diagram illustrating an example of a configuration of the polarization reproduction unit composing the coherent optical receiver according to the second exemplary embodiment of the invention. Compared with the polarization reproduction unit of the first exemplary embodiment (refer to FIG. 3), a polarization reproduction unit shown in FIG. 5 further includes a phase determination unit 15 and a phase rotation unit 16.

The phase determination unit 15 determines whether or not the phase difference δ is random. The phase determination unit 15 determines whether or not to compensate the phase of the combined signal on the basis of the amount of compensation after modification, based on the ratio of the power α or the phase difference δ received from the coefficient calculation unit 12, and outputs the determination result to the phase rotation unit 16.

The phase rotation unit 16, based on the determination result, carries out processing which rotates, by $(1-\alpha)\delta$, the baseband signal $E_s'$ rotated by $-(1-\alpha)\delta$ compared with the optical transmission signal and outputted, or carries out processing which outputs the baseband signal $E_s'$ rotated by $-(1-\alpha)\delta$ compared with the optical transmission signal and outputted, without any change.

FIG. 6 is a flowchart illustrating an example of operations of the polarization reproduction unit shown in FIG. 5.

The phase determination unit 15 receives the ratio of the power α or the phase difference δ from the coefficient calculation unit 12 (step S10). The phase determination unit 15 determines whether or not the phase difference δ is random (step S11). The phase determination unit 15 outputs the determination result to the phase rotation unit 16.

The phase rotation unit 16 determines whether or not the received determination result represents that the phase difference δ is random (step S12). If the phase difference δ is random (No in step S12), the phase rotation unit 16 outputs, without any change, $E_s'$ which is the output of the polarization reproduction processing unit 13 (i.e. signal rotated by $-(1-\alpha)\delta$) to the next unit (phase reproduction processing unit 14). On the other hand, if the phase difference δ is not random (Yes in step S12), the phase rotation unit 16 rotates $E_s'$ which is the output of the polarization reproduction processing unit 13 by $(1-\alpha)\delta$ and outputs the rotated signal (step S14).

According to the second exemplary embodiment, if the phase difference δ is not random, the phase rotation unit 16 rotates $E_s'$ which is the output of the polarization reproduction processing unit 13 by $(1-\alpha)\delta$ and outputs the rotated signal. It is therefore avoidable to falsely recognize a symbol in the phase reproduction processing unit 14.

The phase determination unit 15 can perform the above determination using the phase difference $\delta$. For example, the phase determination unit 15 calculates $D[t]=|\delta[t+1]-\delta[t]|$ which is a time difference of the phase difference. Here, t represents time. The phase determination unit 15 determines whether or not the number of times in which the difference D[t]>Dth is equal to a given number of times k. Here, the Dth is a given difference threshold value. If the number of times in which the difference D[t]>the threshold value Dth is equal to k, the phase determination unit 15 determines that the phase difference $\delta$ is random. On the other hand, if the number of times in which the difference D[t]>the threshold value Dth is not equal to k, the phase determination unit 15 determines that the phase difference $\delta$ is not random. The phase determination unit 15 calculates $D[t]=|\delta[t+1]-\delta[t]|$ which is the difference between the phase difference $\delta[t]$ at a sampling time and the phase difference $\delta[t+1]$ at the next sampling time with respect to each sampling time. If the number of times in which the value exceeds the threshold value Dth=0.5 is k, it is determined that the phase difference $\delta$ is random, when k reaches 3. Certainly, the threshold value and the number of times k in which the threshold value is exceeded can be arbitrarily set.

The phase difference determination may be consecutively performed and periodically performed in accordance with a time schedule.

The phase determination unit 15 can perform the above determination using the ratio of the power $\alpha$. For example the phase determination unit 15 can determine the phase difference $\delta$ is random if $\alpha \approx 1$, 0, and the phase difference $\delta$ is not random if $0<\alpha<1$.

Of course, each of the examples of the determinations above described is one example. The determination of the phase determination unit 15 is not limited thereto.

Third Exemplary Embodiment

FIG. 7 is a block diagram illustrating an example of a configuration of an optical receiver 100 according to a third exemplary embodiment of the invention. The optical receiver 100 includes a separation means 101, calculation means 102, and combination means 103.

The separation means 101 separates a single polarization multi-level phase optical signal into a first optical signal and a second optical signal which are mutually orthogonal.

The calculation means 102 calculates a ratio of power of the first optical signal to power of the second optical signal, and a difference between a phase of the first optical signal and a phase of the second optical signal, as an amount of compensation.

The combination means 103 combines, based on the ratio and the amount of compensation, the first optical signal and the second optical signal using a maximal ratio combining method. Here, the combination means 103 modifies the amount of compensation based on the ratio.

According to the third exemplary embodiment, in reception of the multi-level phase optical signal, reception in which receiving sensitivity does not depend on a polarization state can be performed.

The first to the third exemplary embodiments above described may be materialized as given hardware, e.g. a circuit.

The first to the third exemplary embodiments above described may be controlled and operated by a computer circuit (e.g. CPU (Central Processing Unit), not shown) based on a control program. In this case, the control program is stored in, for example, a storage medium in an optical receiver or an external storage medium, and is read and executed by the computer circuit. A ROM (Read Only Memory) or a hard disc is exemplified as an internal storage medium. A removable media or a removable disc is exemplified as the external storage medium.

The first to the third exemplary embodiments above described are examples, and the invention is not limited to the exemplary embodiments above described.

Regarding "optical reception method" of the invention, the order of the processes is not limited to the order described in claims.

Though being described based on the above exemplary embodiment, the inventions are not limited to the exemplary embodiment above described. It is to be understood that to the configurations and details of the invention of the present application, various changes can be made within the scope of the invention of the present application by those skilled in the art.

This application claims priority from Japanese Patent Application No. 2011-095190 filed on Apr. 21, 2011, the contents of which are incorporation herein by reference in their entirety.

REFERENCE SIGNS LIST

1 Polarization beam splitter
2 Local oscillation light generation unit
3 Optical light receiver unit
4, 5 90-degree hybrid
6, 7, 8, 9 Optical/electrical conversion unit
10 Polarization reproduction unit
11 Demodulation processing unit
12 Coefficient calculation unit
13 Polarization reproduction processing unit
14 Phase reproduction processing unit
15 Phase determination unit
16 Phase rotation unit
100 Optical receiver
101 Separation means
102 Calculation means
103 Combination means

What is claimed is:

1. An optical reception method, comprising:
   separating, by a separation unit implemented at least in hardware, a multi-level phase optical signal of a single polarization into a first optical signal and a second optical signal of which polarizations are mutually orthogonal;
   calculating, by a calculation unit implemented at least in hardware, a ratio of power of the first optical signal to power of the second optical signal;
   calculating, by the calculation unit implemented at least in hardware, a difference between a phase of the first optical signal and a phase of the second optical signal, as an amount of compensation; and
   combining, by a combination unit implemented at least in hardware, on a basis of the ratio and the amount of compensation, the first optical signal and the second optical signal using a maximal ratio combining method,
   wherein the amount of compensation is made smaller than the difference when the power of the first optical signal is larger than the power of the second optical signal, and
   wherein the first optical signal and the second optical signal are combined by using the following equation for the maximal ratio combining method, $$E_s = \sqrt{\alpha} e^{-j \times (1-f(\alpha)) \times \delta} E_x + \sqrt{1-\alpha} e^{j \times f(\alpha) \times \delta} E_y$$

where $\alpha$ is the ratio of the power, $\delta$ is the amount of compensation, Ex and Ey are the powers of the optical signals, the function $f(\alpha)$ in the equation is a continuous and monotonously increasing function when $\alpha$ lies between 0 and 1, and $f(0)=0$, $f(1)=1$.

2. The optical reception method according to claim 1, wherein the function $f(\alpha)$ is any one of $\alpha$, $\alpha'$, $\sqrt{\alpha}$.

3. The optical reception method according to claim 1, further comprising determining whether or not to compensate the phase of the combined signal on the basis of the amount of compensation.

4. The optical reception method according to claim 3, wherein the determination is performed on the basis of a result of determination indicating whether or not the difference is random.

5. The optical reception method according to claim 4, the determination on whether or not the difference is random is performed on the basis of at least one of the ratio of the power and the difference.

6. An optical receiver, comprising:
a separation unit that separates a multi-level phase optical signal of a single polarization into a first optical signal and a second optical signal of which polarizations are mutually orthogonal;
a calculation unit that calculates a difference between a phase of the first optical signal and a phase of the second optical signal as an amount of compensation, and calculates a ratio of power of the first optical signal to power of the second optical signal; and
a combination unit that combines, on a basis of the ratio and the amount of compensation, the first optical signal and the second optical signal using a maximal ratio combining method,
wherein the amount of compensation is made smaller than the difference when the power of the first optical signal is larger than the power of the second optical signal, and wherein the first optical signal and the second optical signal are combined by using the following equation for the maximal ratio of combining method $$E_s = \sqrt{\alpha} e^{-j \times (1-f(\alpha)) \times \delta} E_x + \sqrt{1-\alpha} e^{j \times f(\alpha) \times \delta} E_y$$

where $\alpha$ is the ratio of the power, $\delta$ is the amount of compensation, Ex and Ey are the powers of the optical signals, the function $f(\alpha)$ in the equation is a continuous and monotonously increasing function when $\alpha$ lies between 0 and 1, and $f(0)=0$, $f(1)=1$.

7. A non-transitory computer-readable recording medium storing a computer program that causes a computer of an optical receiver to execute
a function of separating a multi-level phase optical signal of a single polarization into a first optical signal and a second optical signal of which polarizations are mutually orthogonal;
a function of calculating a ratio of power of the first optical signal to power of the second signal;
a function of calculating a difference between a phase of the first optical signal and a phase of second optical signal, as an amount of compensation; and
a function of combining, on a basis of the ratio and the amount of compensation, the first optical signal and the second optical signal using a maximal ratio combining method,
wherein the amount of compensation is made smaller than the difference when the power of the first optical signal is larger than the power of the second optical signal, and wherein the first optical signal and the second optical signal are combined by using the following equation for the maximal ratio of combining method $$E_s = \sqrt{\alpha} e^{-j \times (1-f(\alpha)) \times \delta} E_x + \sqrt{1-\alpha} e^{j \times f(\alpha) \times \delta} E_y$$

where $\alpha$ is the ratio of the power, $\delta$ is the amount of compensation, Ex and Ey are the powers of the optical signals, the function $f(\alpha)$ in the equation is a continuous and monotonously increasing function when $\alpha$ lies between 0 and 1, and $f(0)=0$, $f(1)=1$.

* * * * *